United States Patent [19]

Van Antwerp et al.

[11] Patent Number: 4,752,412

[45] Date of Patent: Jun. 21, 1988

[54] PRECIOUS METAL RECOVERY USING OZONE

[75] Inventors: William P. Van Antwerp, Pacific Palisades; Phillip A. Lincoln, Casitas Springs, both of Calif.

[73] Assignee: GSP Metals and Chemicals Corp., Los Angeles, Calif.

[21] Appl. No.: 11,370

[22] Filed: Feb. 6, 1987

Related U.S. Application Data

[60] Continuation of Ser. No. 822,474, Jan. 27, 1987, abandoned, which is a division of Ser. No. 785,582, Oct. 8, 1985, Pat. No. 4,642,134.

[51] Int. Cl.$^4$ .............................................. C01B 15/01
[52] U.S. Cl. ......................... 252/186.22; 252/186.43; 423/22; 423/27; 423/29; 75/101 R; 75/118 R; 75/121
[58] Field of Search ............... 423/22, 24, 27, 29; 252/186.41, 186.43, 186.22; 75/101 R, 105, 118 R, 1 R, 2, 121; 210/760

[56] References Cited

U.S. PATENT DOCUMENTS

| | | | |
|---|---|---|---|
| 955,318 | 4/1910 | Collins | 423/29 |
| 976,043 | 11/1910 | Collins | 423/29 |
| 976,044 | 11/1910 | Collins | 423/29 |
| 3,574,600 | 4/1971 | Scheiner et al. | 75/105 |
| 4,155,983 | 5/1979 | Zaleski | 423/27 |
| 4,230,571 | 10/1980 | Dadd | 422/54 |

*Primary Examiner*—Robert L. Stoll
*Attorney, Agent, or Firm*—Sheldon & Mak

[57] ABSTRACT

A method for recovering precious metals from ore is disclosed. Ore is treated in an acidic slurry with an activated oxygen mixture obtained from an ultraviolet light ozone generator. The activated oxygen frees chemically bonded precious metals creating an expanded, hydrated ore so that the metals may be oxidized and leached out using standard leaching techniques. In addition, the activated oxygen aids in the leaching process. Substantial increases in the amount of precious metal recovered from a given amount of ore result.

33 Claims, No Drawings

PRECIOUS METAL RECOVERY USING OZONE

BACKGROUND OF THE INVENTION

1. Field of the Invention

The present invention relates to the field of precious metal recovery from ore. More specifically, it relates to an improved method for recovering gold and other precious metals contained in ore in an amount not previously attainable.

2. Description of the Prior Art

Standard recovery techniques used to recover gold and other precious metals (such as silver, platinum, iridium, rhodium, palladium, osmium, and ruthenium, hereinafter incorporated in the use of the term "gold") from an ore usually proceed by separating organic material from the metals by thermal or mechanical means, followed by chemical dissolution of the gold as either the tetracyanide complex, the tetrachloride complex, or sometimes as the EDTA complex. Typical examples of ore recovery using cyanide include U.S. Pat. No. 4,188,208 to Guay and U.S. Pat. No. 4,401,468 to Henderson.

In many gold containing ores, minerals such as titanates, alumina silicates, or iron/aluminum silicates are complexed with the gold. In these cases, the availability of gold to the technique of chemical oxidation followed by dissolution is minimal. (While the Guay patent cited above discusses oxidizing carbonaceous ores with air followed by chlorine, such a process has little effect on these types of ore and generally gives poor results.) For example, gold complexed with alumina has an effective redox potential for oxidation of greater than 1.3 volts. This is the effective potential necessary to free the gold from the alumina before dissolution by cyanide or chloride is possible. Since the effective oxidation potential of free cyanide is only 0.9 volts, and the oxidation potential of hypochlorite is only 1.1 volts, neither can dissolve the gold from the alumina. In the case of titanium silicates, the gold can be even more bound, requiring approximately 1.9 volts. In other cases, the presence of free iron in the Fe° state, or as ferrous metal complexes, changes the chemistry from simple oxidation of gold to the gold/iron couple, thus preventing gold recovery. Basically, gold is oxidized by cyanide, then is reduced by oxidizing the iron, and then is oxidized. Unless the gold is present at greater concentrations than the iron, or some other technology is available, the gold is unrecoverable. Large amounts of gold remain trapped in the ore with a resultant loss, given the high price of gold, of a dramatic amount of economic return.

In addition, intense roasting of many ores can cause the actual loss of so called micron gold. The boiling point of gold is sufficiently high that roasting does not actually vaporize the gold; however, very small particles of gold can be lost as an aerosol. Unless electrostatic precipitation apparatus are installed, and particulates are recovered with great care, as much as 75% of all gold in a particular type of ore can be lost.

Accordingly, there exists a clear need for a method of recovering a larger proportion of the precious metals contained in ore at an economic cost that has no detrimental side effects or results.

Ozone has long been used in precious metal mining in the destruction of the cyanides used for leaching the metals from the ore. Ozone, an allotrope of oxygen, is a pale blue gas, irritating to the nose and mucous membranes, with the formula $O_3$. It is a very highly reactive molecule, decomposing upon reaction to normal diatomic oxygen, as well as to atomic oxygen, a very powerful chemical oxidizing agent. The history of ozone started in the late 1850's with the development of the many electrical experiments done at that time. The uses of ozone have been experimentally tested for approximately 100 years, with most of the potential uses still awaiting discovery. The oxidation potential of ozone is about 2.07 volts depending on the pH and other chemical properties of the reaction, or about 47 kcal/mole. Since the bond strengths of most chemical bonds in molecules are only about 25 to 35 kcal/mole, ozone is potentially able to react by bond breaking with most molecules. The magnitude of this reactivity is the major benefit of using ozone for chemical and biological purposes.

Two methods of commercially producing ozone and other reactive oxygen molecules currently exist. The first method is the spark source generator. Such a generator relies on the passage of high energy electrons from a corona discharge to react with diatomic oxygen in air. Some of the oxygen in the air is converted to atomic oxygen. The oxygen atoms then can react with diatomic oxygen to produce ozone. Despite the large capital costs and the sometimes complex technology, most commercial ozone production installations have been of the spark source type and this is the type of ozone currently used for cyanide destruction in precious metal recovery.

In contrast to the energy intensive spark source ozone generators, a second method of ozone production is possible. It has long been known that a layer of ozone resides near the top of the atmosphere. This ozone is produced by a photochemical reaction between the intense ultraviolet radiation of the sun and the oxygen of the atmosphere. Ultraviolet light creates ozone by the same mechanism as the spark source generators, namely the reaction of diatomic oxygen with UV light producing atomic oxygen. This atomic oxygen then reacts with diatomic oxygen to produce ozone. In addition to the ozone produced, several other reactive species are produced in the discharge that are also of use in commercial applications. This group of compounds produced by a UV ozone generator is sometimes referred to as activated oxygen. One has to be careful, however, that the design of a UV ozone generator is such that the oxygen is not overly exposed to the UV light because the same UV irradiation that produces the ozone also destroys it. In addition, the wavelength used in the generator should be less than 200 nanometers to avoid destroying the ozone.

At the present time, UV produced ozone is used almost exclusively for aqua filtration and pool and tub disinfection because of its favorable germicidal effect. Examples of such use are set forth in U.S. Pat. Nos. 4,517,084 to Pincon, 4,230,571 to Dadd, 4,189,363 to Beitzel, 4,179,616 to Coviello et al., and 3,336,099 to Czulak et al. UV ozone has not been used in the recovery of precious metals.

SUMMARY OF THE INVENTION

The present invention provides a process for recovering precious metal from ore. UV ozone is bubbled through an acidic slurry of ore, breaking down the chemical complexes that prevent the majority of the precious metal from being recovered by standard recovery techniques. After these chemical bonds have been broken, resulting in a dramatic expansion of the ore volume, UV ozone is further used as a substitute for air or oxygen in the typical leaching procedure prior to final recovery of the precious metal.

Accordingly, it is a primary object of this invention to provide a process for allowing the recovery of large amounts of gold and other precious metals previously unrecoverable because such precious metal was chemically bound into the surrounding ore's molecular structure.

It is another object of this invention to provide an apparatus for carrying out the process of this invention. It is yet a further object of this invention to obtain an expanded precious metal ore capable of being subjected to standard leaching techniques and thereby recovering large amounts of precious metal previously unrecoverable.

Other objects, aspects, and advantages of the invention will be apparent to those skilled in the art upon the reading of the specification and the appended claims.

DETAILED DESCRIPTION OF THE PREFERRED EMBODIMENT

The use of ozone for gold mining, and in particular, the use of activated oxygen for the enhanced recovery of gold, is based on the high reactivity of the activated oxygen species produced in the UV reactor, and on the particular redox chemistry of gold. If one can oxidize the gold from the $Au^o$ state to the $Au^1$ state, then the cyanide or chloride present in the leaching solution can be relied on to recover the gold. In many ores the measured redox potential of gold oxidation is greater than 1.7 volts, however, and only elemental fluorine and ozone possess the oxidizing power to oxidize gold under these conditions. Fluorine is extremely hazardous and thus is not a viable alternative.

In addition, it has been shown that while spark source ozone generators will produce ozone with an oxidation potential of approximately 1.7V to 1.9V, UV ozone generators can produce activated oxygen with oxidation potentials at least as high as 2.4V. In a spark source generator, ozone is the only oxidizing species present in the discharge, thus precluding reactivity with certain types of molecules requiring higher oxidation potentials. In the UV reactor-produced ozone, an entire series of "activated oxygen" species are formed that include hydroxyl OH, atomic oxygen, hydrogen peroxide, hydrogen dioxide $HO_2$, and hydrogen peroxides dimers and trimers as well as ozone. These additional species are all excellent oxidizers and thus the reason for the increased reactivity of activated oxygen as compared to simple ozone is probably the ability of OH and 0 radicals to oxidize even very robust chemicals. Conversely, in most cases the output of a spark source ozone generator will simply not have sufficient oxidizing power to oxidize the gold. Thus, the use of UV ozone is markedly superior.

A key question is why the output of a UV reactor is so different than a spark source generator if the basic reactions to form the ozone are the same. Complete understanding of the entire process of ozone production by UV is very sketchy at the present time, since over 17 basic reactions and 40 secondary reactions occur. A simplified picture, however, is as follows: Oxygen as it normally occurs in the air is a triplet molecule, meaning that each molecule has two unpaired electrons. UV light, when reacting with the oxygen, splits the molecule into two radical oxygens with very high energy content. In contrast, electron bombardment in a spark source reactor produces oxygen radicals with much lower electronic energies. The high energy atoms produced by the UV reactors then proceed to react with other oxygen and hydrogen-containing molecules in the gas stream. The spark source produced oxygen atoms can react only with other atoms, (e.g., nitrogen to produce $NO_x$) and with diatomic oxygen. The symmetry rule for chemical reactions predicts that photochemically produced oxygen atoms should be at least three times as reactive as atoms produced by either thermal means or electron bombardment. In practice, experimentally produced UV oxygen is at least 2.8 times as reactive.

While any type of UV ozone generator will produce the range of species discussed above and termed activated oxygen, and thus have an increased reactivity usable with the process of this invention, the proportions of each species may vary. U.S. Pat. No. 4,214,962 to Pincon, incorporated herein specifically by reference, describes a typical UV ozone generator (in that particular case being used for water treatment). Other examples of UV ozone generators include U.S. Pat. No. 4,329,212 and 4,427,636 to Obenshain, and U.S. Pat. No. 4,317,044 to Vaseen. In a preferred embodiment used with the process of this invention, a standard UV generator such as that of the Pincon patent is modified so that the airflow is constrained to a much longer path length resulting in a greater residence time for the gasses within the generator. Preferably, a residence time of three minutes is established with a preferred minimum of one and a half minutes. (Care should be taken, however, that the residence time is not too long because, as mentioned above, the same UV that generates the activated oxygen will also ultimately destroy it.)

The longer residence time is the basis for the higher concentrations of reactive species that are desirable with the process of the present invention. A study performed by the University of Georgia using mass spectroscopy on the output of a standard UV reactor (as designed by the Pincon patent, cited above) gave the following results:

| Species | % of Output |
| --- | --- |
| Ozone | 69% |
| Hydroxyl OH | 11% (Depending on feed humidity) |
| Atomic Oxygen | 6.5% |
| Hydrogen Peroxide | 4.4% |
| Hydrogen Dioxide $HO_2$ | 2.3% |
| Hydrogen Peroxides dimers and trimers | 6.8% |

While such an activated oxygen composition is certainly usable with the process of the present invention, it is preferable that the mixture contain a maximum of 70% ozone, a minimum of 20% hydroxyl, and a minimum of 5% of the remaining compounds listed. In a more preferred embodiment, the mixture contains 40% ozone, 40% hydroxyl, and 5% each of each of the remaining compounds. Such a mixture has a redox potential of 2.4 V. Such a high redox potential enables the process of the present invention to recover precious metal from almost any type of ore.

In the process of the present invention, the mined ore is put into a slurry in a slurry tank having a mixer and the slurry is acidified with hydrochloric acid, acetic acid, or any of the mineral acids (nitric, sulfuric, hydrochloric, phosphoric, or hydrofluoric) to a pH level of 3.0 or below. In a preferred embodiment, acetic acid is added in the range of 1-3% by volume.

UV ozone from a UV ozone generator is then continually sparged into the slurry solution with the object being to maintain the slurry saturated in activated oxygen. The rate will vary with the amount of ore being processed and with the amount of activated oxygen producible by the UV ozone reactor. In a preferred embodiment of the reactor, a large number of lamps are used for higher irradiation intensity. Since the amount of activated oxygen produced depends on the number of photons bombarding the feed, this allows a greater amount of feed to be processed into activated oxygen while avoiding the problems, mentioned above, caused by lengthy residence times.

As discussed above, in many types of ore, precious metal present is predominantly chemically bound within the ore, being bound to several different atoms at once and forming a structure somewhat crystalline in nature. The oxidation potential required to break out the precious metal from this complex is typically too high for any of the normal leaching processes, or even spark source ozone, to be effective. As one result of this phenomenon, standard fire assays used to determine the gold or precious metal content of a particular ore may underestimate the actual amount of precious metal present because fire assays will normally only measure the amount of neutral, non-bonded precious metal.

The very high oxidation potential of the activated oxygen mixture being sparged into the slurry is sufficient to break most of the bonds binding the precious metal to the other ore elements. As a direct result of such bond breaking, the ore being treated will expand, typically up to fifteen to twenty times its original volume. Rather than remaining as a compact, crystalline-like ore, the structure of the ore becomes hydrated and somewhat amorphous. This dramatic increase in volume through the breaking of chemical bonds allows a much larger percentage of the precious metal to be reached by the standard type of leaching processes.

After the ore has been expanded, typically for approximately 2 hours, the pH level of the slurry must be raised in order to leach out the precious metal. Lime ($CaCo_3$) is added to bring the slurry to pH 7.0 and then caustic soda (NaOH) is added to raise the pH to 11.0 or higher.

Once the slurry is suitably basic, it is heated to a temperature of 150°-200° F., with a preferred embodiment being at 180° F. Ozone has been continuously sparging through the slurry throughout the process to this point. It is preferable to use a second tank with a heating mechanism and a sparger for the steps involved once the slurry is to be made basic. Standard leaching chemicals can now be added using any of a number of standard procedures known to those of ordinary skill in the art. Such chemicals may include any of the following: cyanide, hypochlorite, ferrous/hypochlorite, thiourea, or thiocarbamate. The leach chemistry only works in a basic solution on precious metals that have been oxidized. The present invention uses the activated oxygen to oxidize the precious metal as well after the bonds binding it to the other ore components have been broken because of its outstanding ability to oxidize. Tests have shown that ozone serves to oxidize gold in a cyanide solution at a rate 100 times faster than normal oxygen.

The slurry is allowed to react at the elevated temperature for a period of time typically ranging from 4 to 6 hours while the activated oxygen continues to be bubbled through. (Of course, the amount of time allowed can be more or less than this, but economic maximization generally dictates the prescribed period.) The leach chemicals act to chelate the precious metal, allowing it to dissolve into the solution.

After reacting the slurry solution, the activated oxygen source is turned off, and the remaining, undissolved ore is allowed to settle. The chelated precious metal remains in solution. From this point on, the solution may be pumped off and standard recovery techniques well known to those skilled in the art are employed to finally recover the precious metal in purified form.

Laboratory results and modified pilot plant studies have shown dramatic increases in gold recovery from gold bearing ores. (See examples discussed below). The economics of ozonation are such that, in many cases, ore that is unprofitable under conventional treatment, and that would not normally be worked, can now be worked at a substantial profit. Even tailings from prior ore refining can now be reused to recover substantial amounts of precious metal that was unrecoverable using the standard techniques of the original mining operation. The vast amount of tailings available will now constitute a ready source of precious metal.

Ore containing free gold or "leachable" gold can also be profitably treated with activated oxygen. In the case of free gold, ozone greatly reduces the amount of leaching required to dissolve the gold, in many cases either reducing the required concentration of cyanide by 50% or increasing the concentration of gold in the leaching solution by 35 to 50%. The advantages of higher concentrations are obvious—less labor to produce gold metal, less waste treatment problems, and reduced water consumption.

The process of the present invention has been found to work on a large variety of starting ores including granite, pyrite, clays, sulfides, and bentonite. Typically, clay and sulfide ores have proven the most difficult from which to recover precious metals, but the process of this invention achieves excellent results even with these hard-to-work-with ores. Currently, the only ore found not to be treatable by the patent process is quartz, because it appears to require an oxidation potential of 2.6 V.

It has been found that the method of the present invention is particularly useful in recovering particles of precious metal that measure below 5 microns as compared to the inefficiency of recovering such miniscule particles by traditional means.

The following sample results will further illustrate the process of the present invention and the surprising results obtained through its use. These examples are given by way of illustration and are not intended to act as a limitation on the scope of this invention.

Nine different samples of ore, eight obtained from various locations on Salkatniak Island in Alaska and one from Utah, were processed by the method of this invention in parallel with standard recovery techniques and a fire assay. Using the preferred UV ozone generator, which gives a species mix of 40% ozone, 40% hydroxyl, and 5% each of atomic oxygen, hydrogen peroxide, hydrogen dioxide $HO_2$, and the higher molecular weight peroxides, the slurried ore was allowed to expand for 2 hours at a pH of substantially 3.0. After raising the pH, standard leaching techniques were used using hypochlorite as the leaching chemical. Finally, atomic absorption spectroscopy was used to determine the precious metal content of each sample. The results are tabulated in the following table.

| | AMOUNT RECOVERED (OZ./TON ORE) | | |
|---|---|---|---|
| | UV OZONE TREATMENT | | FIRE ASSAY |
| SAMPLE # | GOLD | SILVER | GOLD |
| 1 | 5.1 | 13.1 | 0.29 |
| 2 | 2.7 | 4.9 | 0.13 |
| 3 | 2.1 | 5.4 | 0.17 |
| 4 | 2.9 | 5.6 | 0.14 |
| 5 | 0.3 | 0.9 | 0.22 |
| 6 | 2.9 | 0.9 | 0.11 |
| 7 | 3.6 | 5.4 | 0.16 |
| 8 | 4.5 | 5.2 | 0.15 |
| 9 | 2.2 | 5.2 | 0.16 |
| AVERAGE: | 2.92 | 5.18 | 0.17 |

As can be seen, for these samples, the average increase in gold recovery using the process of the present invention was over 1,600% from 0.17 oz/ton ore to 2.92 oz/ton ore. While different ore samples may allow a greater or lesser improvement in gold recovery, such results are fairly typical.

Thus, a method for recovering, in addition to the gold already recoverable, previously metals previous unrecoverable by standard techniques is disclosed. The method produces an expanded, hydrated ore that is amenable to recovery by standard recovery techniques. While the examples are related to the recovery of gold and silver, this invention is readily applicable to platinum and members of the platinum group.

While the invention has been particularly shown and described with reference to a preferred embodiment, many other uses and modifications of the method of this invention will be apparent to those skilled in the art upon reading this specification. The invention, therefore, is not intended to be limited other than by the lawful scope of the following claims.

What is claimed is:

1. A slurry for use in the recovery of precious metal, the slurry comprising precious metal and activated oxygen, the activated oxygen comprising at least ozone, hydroxyl, atomic oxygen, hydrogen peroxide, hydrogen dioxide, and hydrogen peroxide dimers and trimers.

2. The slurry of claim 1 wherein the activated oxygen comprises a maximum of 70% ozone, a minimum of 20% hydroxyl, and a minimum of 5% each of atomic oxygen, hydrogen peroxide, hydrogen dioxide, and hydrogen peroxide dimers and trimers.

3. The slurry of claim 1 wherein the activated oxygen comprises 40% ozone, 40% hydroxyl, and 5% each of atomic hydrogen, hydrogen peroxide, hydrogen dioxide, and hydrogen peroxide dimers and trimers.

4. A slurry for use in the recovery of precious metal, the slurry comprising precious metal and activated oxygen, wherein the activated oxygen is the product of an ultraviolet light ozone generator.

5. The slurry of claim 1 wherein the slurry comprises a saturating amount of activated oxygen.

6. The slurry of claim 1 wherein at least part of the precious metal is chemically bound within an ore.

7. The slurry of claim 6 wherein the ore is selected from the group consisting of granite, pyrite, clays, sulfides, and bentonite.

8. The slurry of claim 6 wherein the ore is tailings.

9. The slurry of claim 1 wherein the precious metal is selected from the group consisting of gold, silver, platinum, iridium, rhodium, palladium, osmium, and ruthenium.

10. The slurry of claim 1 wherein the precious metal is gold.

11. A slurry for use in the recovery of precious metal and activated oxygen, the activated oxygen comprising at least ozone, hydroxyl, atomic oxygen, hydrogen peroxide, hydrogen dioxide, and hydrogen peroxide dimers and trimers.

12. The slurry of claim 11 wherein the pH is less than 3.

13. The slurry of claim 11 wherein the slurry further comprises an acid selected from the group consisting of this is a mineral acid acetic acid, and mineral acids.

14. The slurry of claim 13 wherein the mineral acid is selected from the group comprising nitric acid, sulfuric acid, hydrochloric acid, phosphoric acid, and hydrofluoric acid.

15. The slurry of claim 11 wherein the slurry further comprises about 1–3% by volume acetic acid.

16. The slurry of claim 11 wherein the precious metal is derived from an ore, the ore having a volume in the slurry up to 20 times its original volume.

17. The slurry of claim 16 wherein the volume of the ore in the slurry is 15 to 20 times its original volume.

18. A slurry for use in the recovery of precious metal, the slurry (a) having a neutral pH and (b) comprising precious metal and activated oxygen, the activated oxygen comprising at least ozone, hydroxyl, atomic oxygen, hydrogen peroxide, hydrogen dioxide, and hdyrogen peroxide dimers and trimers.

19. The slurry of claim 18 wherein the slurry further comprises lime ($CaCO_3$).

20. A slurry for use in the recovery of precious metal, the slurry (a) having a basic pH and (b) comprising precious metal and activated oxygen, the activated oxygen comprising at least ozone, hydroxyl, atomic oxygen, hydrogen peroxide, hydrogen dioxide, and hydrogen peroxide dimers and trimers.

21. The slurry of claim 20 wherein the pH is at least 11.

22. The slurry of claim 20 having a temperature of 150°–200° F.

23. The slurry of claim 20 further comprising a leaching chemical capable of chelating the precious metal so that the precious metal can dissolve into the slurry.

24. The slurry of claim 23 wherein the leaching chemical is selected from the group consisting of cynaide, hypochlorite, ferrous/hypochlorite, thiourea, and thiocarbamate.

25. The slurry of claim 23 wherein the leaching chemical is hypochlorite.

26. The slurry of claim 23 wherein the precious metal is chelated with the leaching chemical.

27. A slurry for use in the recovery of gold, the slurry comprising gold and activated oxygen, the activated oxygen (a) comprising at least ozone and hydroxyl and (b) being the product of an ultraviolet light zone generator.

28. The slurry of claim 27 wherein at least a part of the gold is chemically bound within an ore.

29. The slurry of claim 28 wherein the ore is selected from the group consisting of granite, pyrite, clays, sulfides, and bentonite.

30. The slurry of claim 28 wherein the ore is tailing.

31. A slurry for use in the recovery of precious metal, the slurry (a) having an acidic pH and (b) comprising precious metal and activated oxygen, wherein the activated oxygen is the product of an ultraviolet light zone generator.

32. A slurry for use in the recovery of precious metal, the slurry (a) having a neutral pH and (b) comprising precious metal and activated oxygen, wherein the activated oxygen is the product of an ultraviolet light zone generator.

33. A slurry for use in the recovery of precious metal, the slurry (a) having a basic pH and (b) comprising precious metal and activated oxygen, wherein the activated oxygen is the product of an ultraviolet light zone generator.

* * * * *